(12) United States Patent
Teichmann

(10) Patent No.: US 8,197,277 B1
(45) Date of Patent: Jun. 12, 2012

(54) CHARGER CONNECTOR

(75) Inventor: Keith Teichmann, Newton Centre, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/978,369

(22) Filed: Dec. 23, 2010

(51) Int. Cl.
*H01R 13/62* (2006.01)
(52) U.S. Cl. .................................. 439/304; 439/310
(58) Field of Classification Search .............. 439/34, 439/310, 352–358, 372, 456
See application file for complete search history.

(56) References Cited

U.S. PATENT DOCUMENTS

| | | |
|---|---|---|
| 5,429,524 A | 7/1995 | Wakata et al. |
| 5,529,510 A | 6/1996 | Wakata et al. |
| 5,545,046 A | 8/1996 | Masuda et al. |
| 5,573,417 A | 11/1996 | Hashizawa et al. |
| 5,674,086 A | 10/1997 | Hashizawa et al. |
| 5,984,706 A | 11/1999 | Kakuta et al. |
| 6,123,569 A | 9/2000 | Fukushima et al. |
| 6,283,781 B1 | 9/2001 | Mori |
| 6,371,768 B1 | 4/2002 | Neblett et al. |
| 6,652,306 B2 | 11/2003 | Karamatsu et al. |
| 6,910,911 B2 * | 6/2005 | Mellott et al. ............... 439/358 |
| 7,410,377 B2 * | 8/2008 | Wharton ...................... 439/172 |
| 7,963,793 B2 * | 6/2011 | Poulin et al. ................. 439/352 |
| 8,016,607 B2 * | 9/2011 | Brown, II ..................... 439/353 |
| 8,025,526 B1 * | 9/2011 | Tormey et al. ............... 439/528 |
| 8,075,329 B1 * | 12/2011 | Janarthanam et al. ....... 439/304 |
| 2011/0059642 A1 * | 3/2011 | Slippy et al. ................. 439/353 |
| 2011/0289889 A1 * | 12/2011 | Kohanski et al. ............ 53/485 |

* cited by examiner

*Primary Examiner* — Thanh Tam Le
(74) *Attorney, Agent, or Firm* — Leon D. Rosen

(57) ABSTRACT

An electrical connector (10) which facilitates its proper holding for insertion and latching to a charging station receiver (14). The connector has a body (40) with a front portion (42) that extends along a horizontal axis (60), a rear portion (44) that extends at a rearward-downward inclined axis (62) of approximately 45°, and a middle portion (46) with a bottom (22) that is concavely curved to receive the small fingers of a hand. The front portion of the body has grooves (76) on opposite sides of a top ridge (72), so the person's thumb fits around the ridge and into a groove. A palm pad (30) lies immediately rearward of the top ridge and is automatically depressed by the person's palm to operate a latch (32).

6 Claims, 4 Drawing Sheets

CHARGER CONNECTOR

BACKGROUND OF THE INVENTION

There are plans to establish a large number of charging stations to charge electrically powered vehicles. At each station, a person would insert an electrical connector (e.g. lying at the end of a cable connected to the station) into an electrical receiver on the vehicle and latch it in place. The electrical connector carries high current and may have a weight of a plurality of pounds, so it is desirable to provide a connector that encourages handling in a natural and obvious way.

Prior connectors of this type have latches controlled by triggers operated by the thumb or index finger. Many people are confused as to how to operate them.

SUMMARY OF THE INVENTION

In accordance with one embodiment of the present invention, an electrical connector is provided for grasping in the hand, and for insertion into an electrical receiver, that establishes an electrical connection and a substantially automatic latching to the receiver. The connector includes a body with a body front end portion extending along a horizontal axis, a body rear end portion that holds the end of an electrical cable and that extends at a downward-rearward incline of 45°, and a body middle portion with a concavely curved bottom. A person tends to hold the connector by placing his thumb around the top of the middle portion while his other fingers extend under the concavely curved bottom. This enables the person to insert the connector by grasping it and moving his hand forward in the manner of a handshake.

A palm pad is mounted on the top of the body to automatically operate the latch when a person grasps the connector. The palm pad is pivotally mounted on the body, and has a front end that forms a latch. The palm pad is automatically depressed by the palm when a person grasps the connector, to thereby pivot up the latch. After the connector is inserted into the receiver, the latch is automatically lowered by a spring when the person releases his/her grasp on the body, to thereafter hold the body to the receiver.

The novel features of the invention are set forth with particularity in the appended claims. The invention will be best understood from the following description when read in conjunction with the accompanying drawings.

DESCRIPTION OF THE PREFERRED EMBODIMENT

Figure 1:
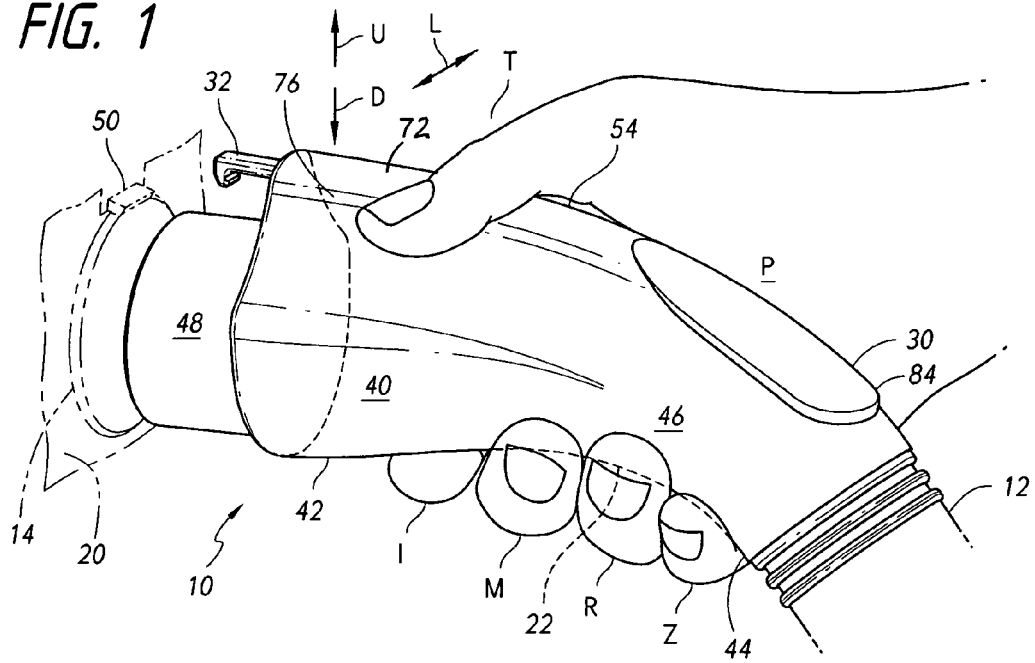
FIG. 1 is an isometric view of an electrical connector, shown held in a person's right hand while being inserted or removed from a receiver.

FIG. 1 shows an electrical connector 10 which lies at the end of a cable 12 and which is designed to connect to a mating connector or electrical receiver 14. In most cases, the receiver 14 is mounted on an electrically powered (with or without an auxiliary gas engine) vehicle 20. The system is designed to carry considerable current to rapidly charge vehicle electrical cells, or batteries, and the connector may have a weight of a plurality of pounds. The connector is designed to be held and connected in a way that is obvious from the shape of the connector and that automatically latches and unlatches the connector. That is, a person grasps the connector with his thumb T extending partially around the top and with his other fingers (non thumb fingers comprising the index I, middle M, ring R and little Z fingers) extending partially around the bottom 22 of the connector. Furthermore, a palm pad 30 is automatically depressed by the person's palm P to operate a latch 32 when the person grasps the connector. As a result, the connector is held and later released from the receiver in the course of connector insertion and removal, without the person paying attention to the latch.

The connector includes a body 40 that is molded of a polymer, and that has a front end portion 42, a rear end portion 44, and a middle portion 46. The latch 32 projects from the body front end portion, parallel to a forward connecting arrangement 48, and can engage a catch 50 on the receiver. The palm pad is pivotally mounted about a laterally L extending axis 52 and is biased upward U to urge the latch 32 downward D. The rear of the palm pad lies about ¼ inch above the adjacent part of the body top surface 33. When a person grasps the connector with his thumb extending partially around the top 54 of the body and his other fingers extending partially about the bottom portion 22, the person's palm rests on the palm pad and depresses it, to depress the pad rear portion 84 and thereby automatically operate the latch to ready it to engage the catch 50 on the receiver.

Figure 2:
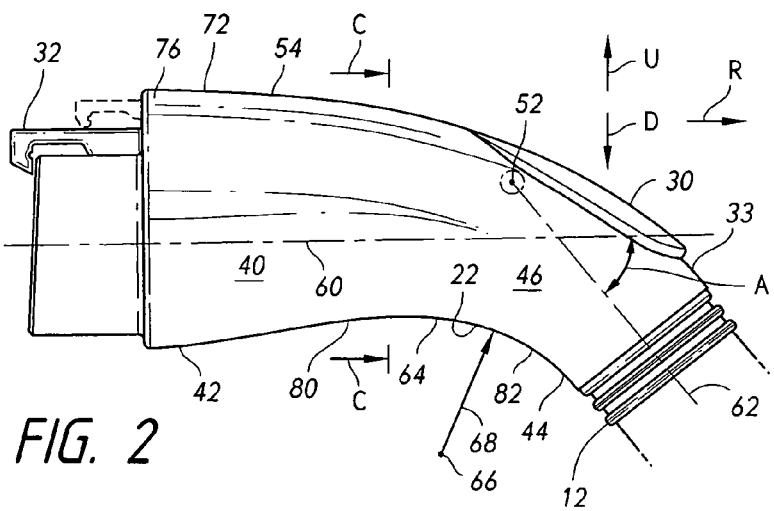
FIG. 2 is a left side elevation view of the electrical connector of FIG. 1.
Figure 3:
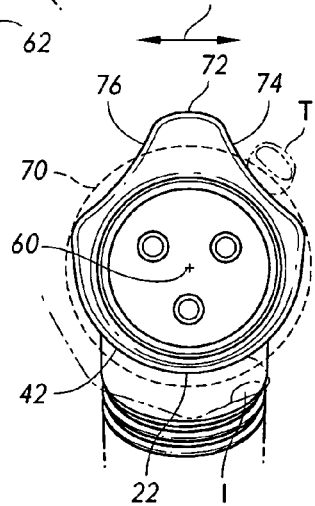
FIG. 3 is a front elevation view of the electrical connector of FIG. 2.

As shown in FIG. 2, the body front portion 42 extends along a primarily horizontal (±10°) axis 60, while the body rear portion 44 and the front end of the electrical cable 12 extend along a downward D and rearward R extending axis 62. The axis 62 extends at a downward angle A of about 45° (45°±15°) from the axis 60. The body has a horizontal width and a vertical height which are about equal (neither one is more than twice the other) along each axis. The bottom 22 of the body has a highly curved portion 64 that is concavely curved about a lateral axis 66 located a distance 68 of about an inch (½ inch to 2 inches) below the body. At the front end 80 of the curved portion 64, at the cross-section C-C, the body has a width and height that are each about 2¼ inch (preferably 1.75 to 2.75 inches). FIG. 3 shows an imaginary circle 70 of 2¼ inch diameter on which the thumb T and index finger I lie. An average sized hand (e.g. a distance of 6 inches between the tips of the thumbs and index fingers) can wrap itself more than 180° around the body middle portion.

As shown in FIG. 3, the body front portion 42 has a largely circular bottom, as viewed along the axis 60, has an upstanding ridge 72 at the top, and has a pair of gently concave grooves or recesses 74, 76 on opposite sides of the ridge. The rear body portion 44 is circular, with a diameter of about 1.7 inch. This shape, which includes a bend at the middle of the body length and a cable extending downward and rearward from the body rear end, makes it obvious to a person who is reaching for the connector to grasp it with the palm pad at the top, and to place his/her thumb in one of the grooves while his/her other fingers extend partially around the bottom portion of the body. As mentioned above, such grasping of the connector results in the person's palm depressing the palm pad when his grip tightens.

Figure 4:
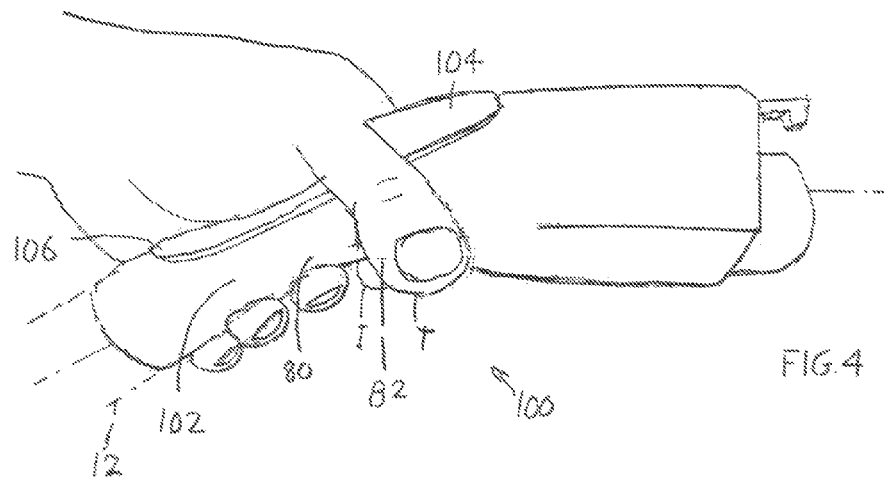
FIG. 4 is a left side view of a modified electrical connector, shown held in a person's left hand.
Figure 5:
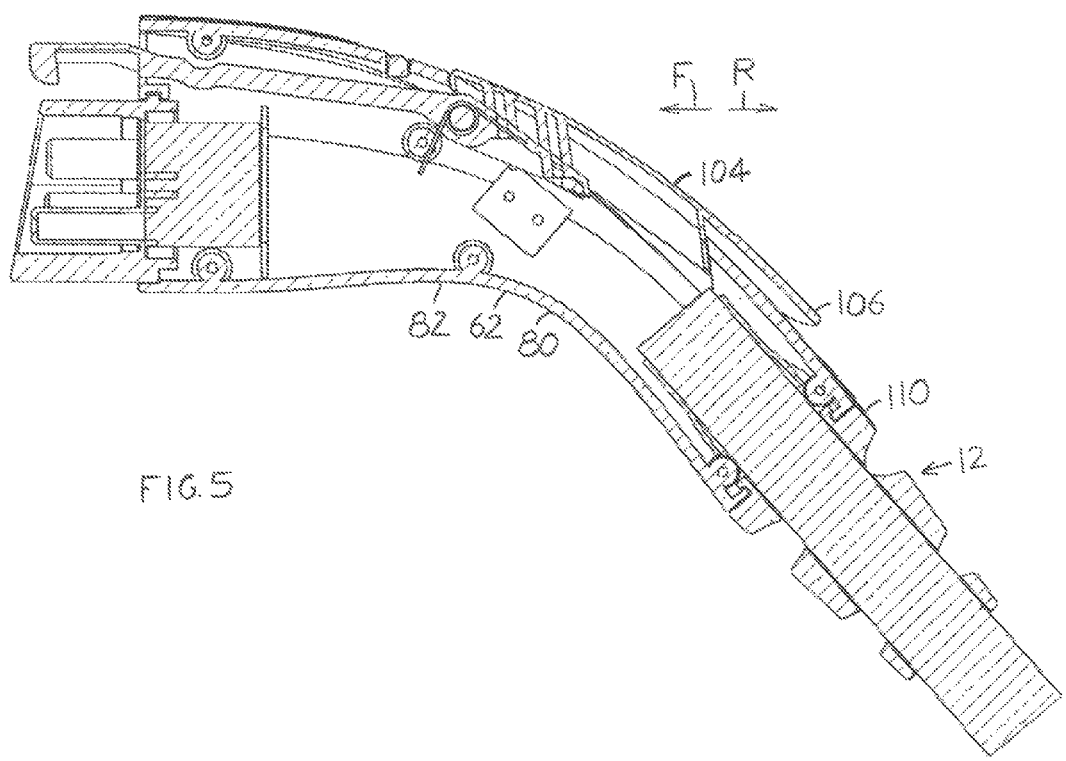
FIG. 5 is a sectional left side view of the connector of FIG. 4.
Figure 7:
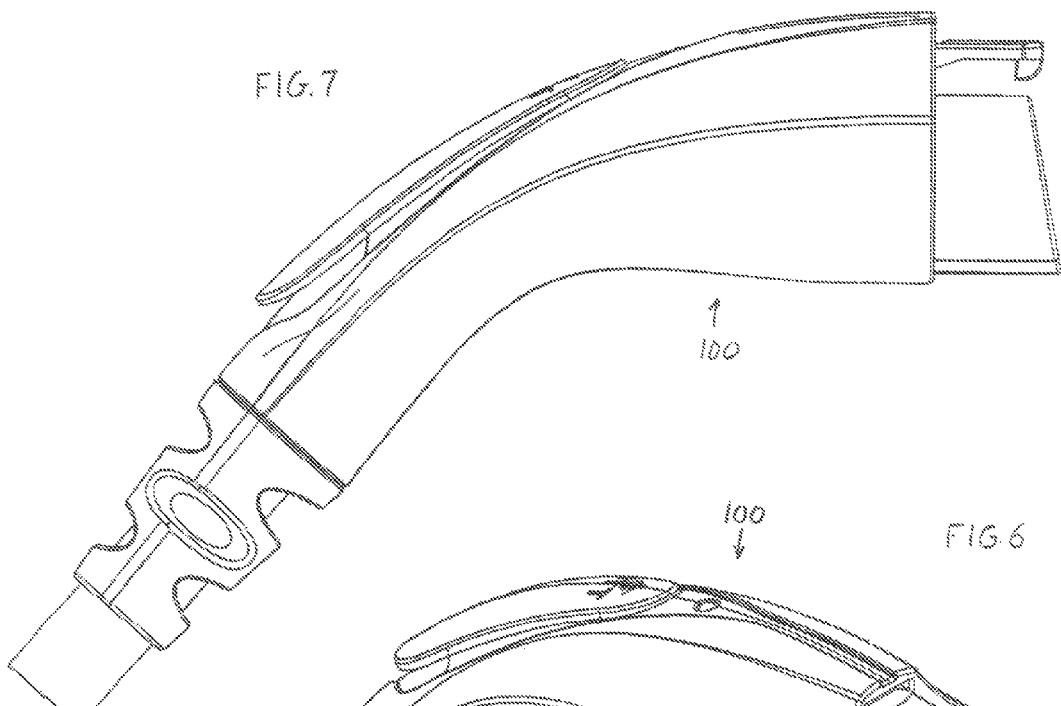
FIG. 7 is a right side elevation view of the connector of FIG. 5.
Figure 6:
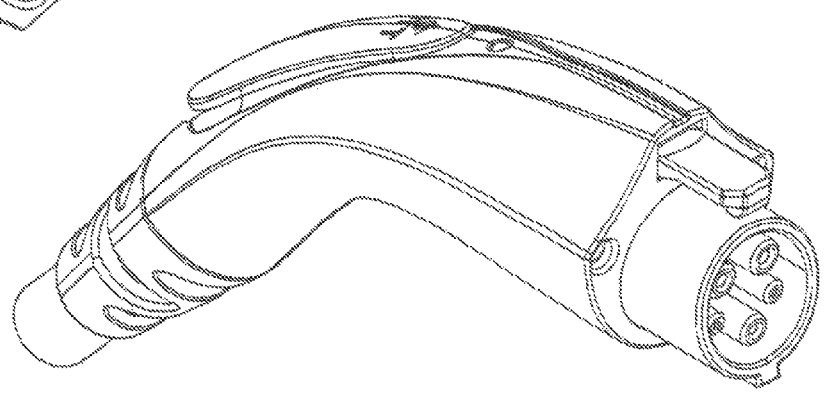
FIG. 6 is a right side and top isometric view of the connector of FIG. 5.
Figure 8:
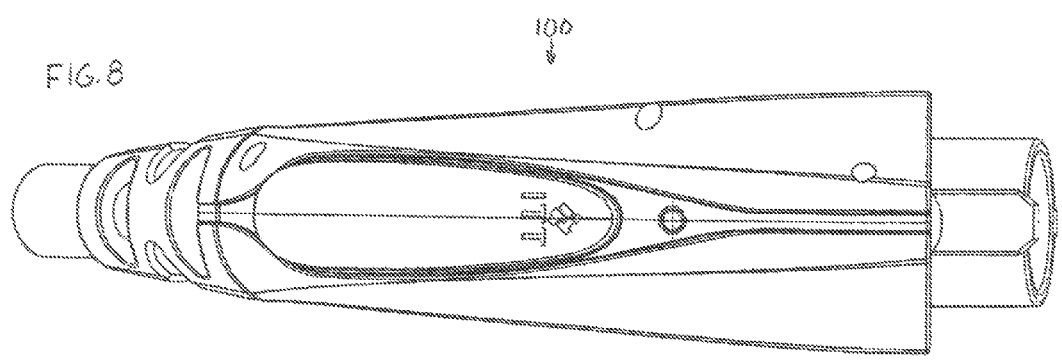
FIG. 8 is a plan view of the connector of FIG. 4
Figure 10:
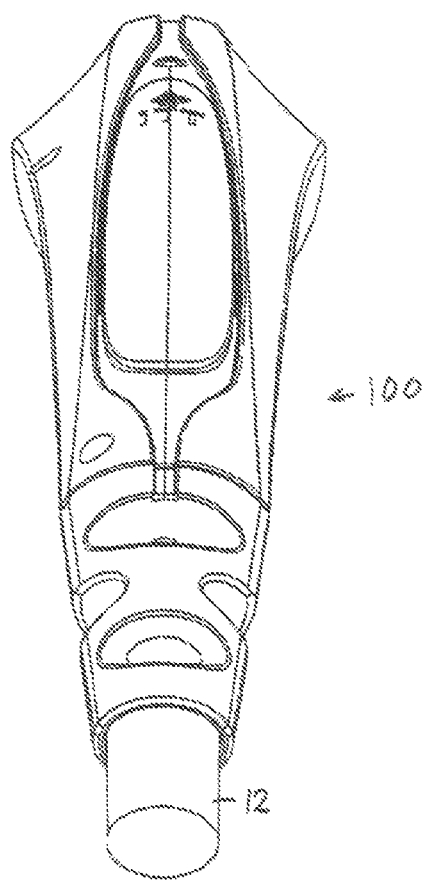
FIG. 10 is a rear elevation view of the connector of FIG. 4.
Figure 9:
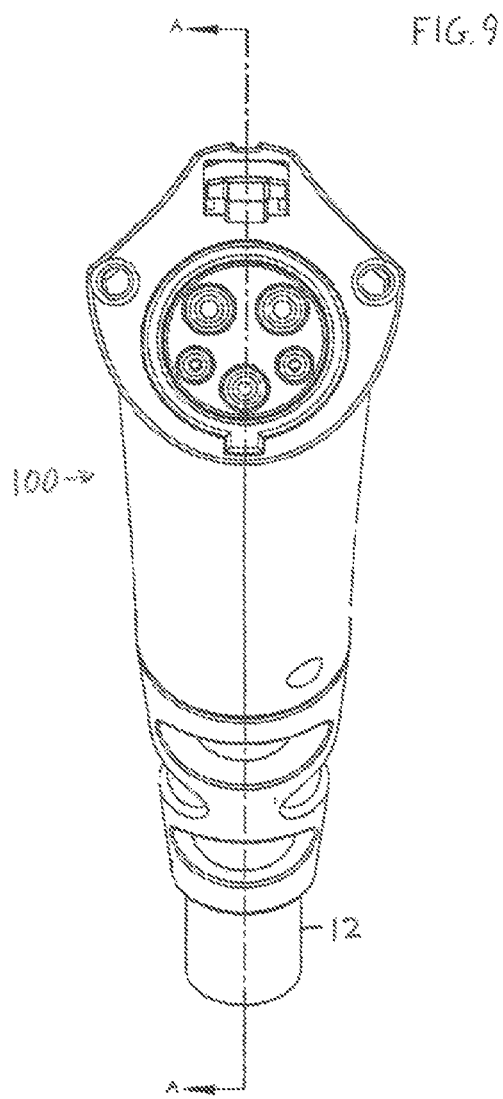
FIG. 9 is a front elevation view of the connector of FIG. 4.

FIG. 4 illustrates the left side of a connector 100 of another embodiment of the invention which is the same as that of FIGS. 1-3, but with a longer rear portion 102. This enables the connector to be readily grasped with the index finger I and thumb T at the front end 82 (FIG. 5) of the concavely curved body bottom portion 64 instead of at the rear 80. The palm pad 104 is longer to extend further rearward, so the connector can be readily grasped in the manner of FIG. 1 or FIG. 4. In either case, the rear end 84, 106 of the palm pad lies within 2¼ inch of the rear of the body where the cable emerges at 110, to minimize the possibility of the palm pad pinching the heel of the person's hand. Pinching of the heel is very unlikely. The rear of palm pad projects upward by about ¼ inch from the body when the pad is not depressed.

A person grasps the connector as shown in FIG. 1 or 4, moves it forward into the mating connector, or receiver 14, and relinquishes his/her grasp. The latch is automatically operated by spring force to hold the connector to the receiver. To remove the connector, the person grasps the connector, and in so doing depresses the palm pad to release the latch and allow the connector to be withdrawn from the receiver.

Thus, the invention provides an electrical connector that can be grasped in a person's hand and inserted into a mating connector, which makes it obvious how the connector should be grasped and which automatically latches and unlatches the connector from the mating connector. The connector is especially useful for a vehicle battery charger, but is useful in other applications. A palm pad is mounted on the connector body, and lies on the top of the body, so the pad is depressed when a person grasps the connector in the manner of a handshake. The body has front, rear, and middle portions. The front portion extends along a primarily horizontal axis, and the rear portion extends along a rearward-downward axis that extends at a downward angle of about 45° from the horizontal. The body middle has a lower surface that is concavely curved about a lateral axis. The shape encourages a person to grasp the connector with his/her thumb extending partially about a top ridge and against the bottom of a gentle groove, and with the other fingers extending partially about the concave lower surface. The connector is usually grasped with the index finger at the front or rear end of the concavely curved lower surface.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector for grasping by the hand and insertion into an electrical receiver, comprising:
    a body (40) having front and rear portions (42, 44) and having a top (72) and bottom (22), said front portion having a primarily horizontal axis (60) and said rear portion having a rear axis (62) extending at a downward-rearward angle to said horizontal axis, and including an electrical cable (12) with a front end extending from said body rear portion;
    said connector including a smoothly-curved depressable palm pad (30) mounted on said body and lying above the level of adjacent portions of a top surface (33) of said body middle and rear portions, said connector having a latch (32) which latches to said electrical receiver and which is connected to said palm pad to be operated by depression of said palm pad;
    said body middle portion (46) lying horizontally between said front and rear portions, the bottom of said body middle portion having a finger-engaging concave lower surface (64) and said body middle having a convex upper surface (54) that forms said top surface, and that enables a person to wrap his index and middle fingers (I, M) under said lower surface (22) while his thumb is wrapped in an opposite direction over said upper surface (54), and the area of his palm lies against said palm pad at a location that lies between said rear and front portions to hold the body with said primarily horizontal axis extending horizontally, so the person can depress the palm pad by pushing up against the body with his index and middle fingers (I, M) to depress the palm of his hand, to operate said latch.

2. The electrical connector described in claim 1, wherein:
    said body lower surface (22) is smoothly concavely curved along said body middle portion, as seen when viewing a side and an end of said connector, with said concave lower surface having a radius of curvature (68) of about an inch and lying opposite said palm pad.

3. The connector described in claim 1 wherein:
    said body front portion has a top forming an upstanding ridge (72) and forming a pair of grooves (74, 76) located on opposite sides of the ridge, with said ridge and grooves each extending parallel to said horizontal axis, the ridge and grooves positioned to enable a person's thumb (T) to extend around a ridge and into a groove while his index, middle, and ring fingers (I, M, R) grip the body lower surface.

4. The connector describe in claim 1 wherein:
    said body middle portion which forms said body lower surface (22) is a fixed surface that is curved in a continuous curve about a lateral axis (66) which is horizontal and perpendicular to said horizontal axis, said lateral axis lying about one inch below said bottom surface.

5. The combination of an electrical connector and a person wherein said connector is grasped by a hand of the person for forward horizontal insertion into an electrical receiver, comprising:
    a connector body having front and rear portions (42, 44) said front portion having a primarily horizontal axis (60) that extends horizontally and said rear portion having a rear axis (62) extending at a downward-rearward angle to said horizontal axis;
    said body having a body middle portion (46) lying between said front and rear portions, said middle portion having a smoothly curved upper surface (33), and the person has wrapped his thumb and index finger (T, I) in opposite directions to wrap them more than a total of 180° around the body middle portion to grasp the connector;
    a palm pad (30) pivotally mounted on said body to pivot about a primarily horizontal axis (52), said palm pad having an upper surface which lies at a top of said middle portion, said palm pad upper portion is convexly and smoothly rounded and primarily a continuation of the surrounding upper surface of the body middle portion except that the palm pad upper surface is raised above the surrounding surface when the palm pad is not depressed, so the person can squeeze the body middle portion while his palm lies on the palm pad, to depress the rear of the palm pad with the person's palm to operate a latch that latches said electrical connector to said electrical receiver.

6. The connector that is grasped by the hand of person, as described in claim 5, wherein:
said body front portion has a top forming an upstanding ridge (72) and forming a pair of grooves (74, 76) located on opposite sides of the ridge, with said ridge and grooves each extending parallel to said horizontal axis, one of the person's thumbs lying on the ridge with an end of the thumb lying in one of the grooves.

* * * * *